Sept. 8, 1970 T. A. MARTZ 3,527,114
GEAR SHIFT CONTROL ARRANGEMENT
Filed Aug. 8, 1968 2 Sheets-Sheet 1

INVENTOR.
THOMAS A. MARTZ
BY
Barber & Latta
ATTORNEYS

Sept. 8, 1970   T. A. MARTZ   3,527,114
GEAR SHIFT CONTROL ARRANGEMENT
Filed Aug. 8, 1968   2 Sheets-Sheet 2

INVENTOR.
THOMAS A. MARTZ
BY
Barbee & Latta
ATTORNEYS

_United States Patent Office_  3,527,114
Patented Sept. 8, 1970

3,527,114
GEAR SHIFT CONTROL ARRANGEMENT
Thomas A. Martz, Detroit, Mich., assignor to American Motors Corporation, Kenosha, Wis., a corporation of Maryland
Filed Aug. 8, 1968, Ser. No. 751,280
Int. Cl. G05g 9/00
U.S. Cl. 74—473  6 Claims

ABSTRACT OF THE DISCLOSURE

An arrangement for shifting the gears of a multi-speed transmission having a pair of externally mounted control levers. The control levers are connected to the shifter shafts and associated shift forks for gear selection located inside the transmission housing. The arrangement including a pair of rods pivotally connected to the control levers and slidably mounted on the transmission and an operator's shift lever pivotally mounted on the transmission and having a portion adapted to directly engage detents in the rods to move same for gear selection.

BACKGROUND OF THE INVENTION

Field of the invention

This invention pertains to gear shift control arrangements for vehicle transmissions.

Description of the prior art

The conventional gear shift control for a vehicle transmission may be located on the steering column and connected to the pair of transmission control levers of a three forward speed transmission by suitable rods. A four speed transmission incorporating three transmission control levers usually has the controls therefor located on the transmission with the operator's shift lever extending therefrom into the vehicle interior. Most four speed control mechanisms include a bracket, a pivot shaft rigidly connected to the operator's shift lever and a pin in the shaft to selectively engage the three levers connected to the aforementioned transmission control levers by rods. This arrangement is expensive due to the large number of parts and also requires considerable effort to operate.

SUMMARY OF THE INVENTION

Applicant's gear shift control arrangement although designed for use with a three speed transmission is also mounted on the transmission. Specifically, Applicant has dispensed with the pivot shaft and levers thereon of the transmission mounted four speed mechanism by pivotally mounting the operator's lever on the transmission and causing same to directly but selectively engage detents of the pair of slidably mounted rods, which are connected to the associated transmission control levers, to select the gears. The resulting control arrangement is extremely economical to produce. Further, because the rods are only moved axially, very little effort is needed to shift gears.

It has been known in the past, and particularly in truck transmissions, for the operator's shift lever to extend into the transmission housing and engage shift forks or associated components directly to move same in the gear shifting process. However, applicant has not encountered before an arrangement as disclosed in this application where the operator's shift lever directly engages the rods to move the external transmission control levers. Of course, the rods are necessary features due to the position of the conventional transmission on the engine clutch housing which is located well forward of the convenient positioning of the vehicle operator's shift lever. Further, to reduce transmission warranty costs, it is preferred to mount the control arrangement outside the transmission.

It is therefore an object of this invention to provide a new and improved gear shift control arrangement.

Another object of this invention is to provide a low effort gear shift control arrangement that is particularly economical to manufacture.

DESCRIPTION OF THE PREFERRED EMBODIMENT

Figure 1:
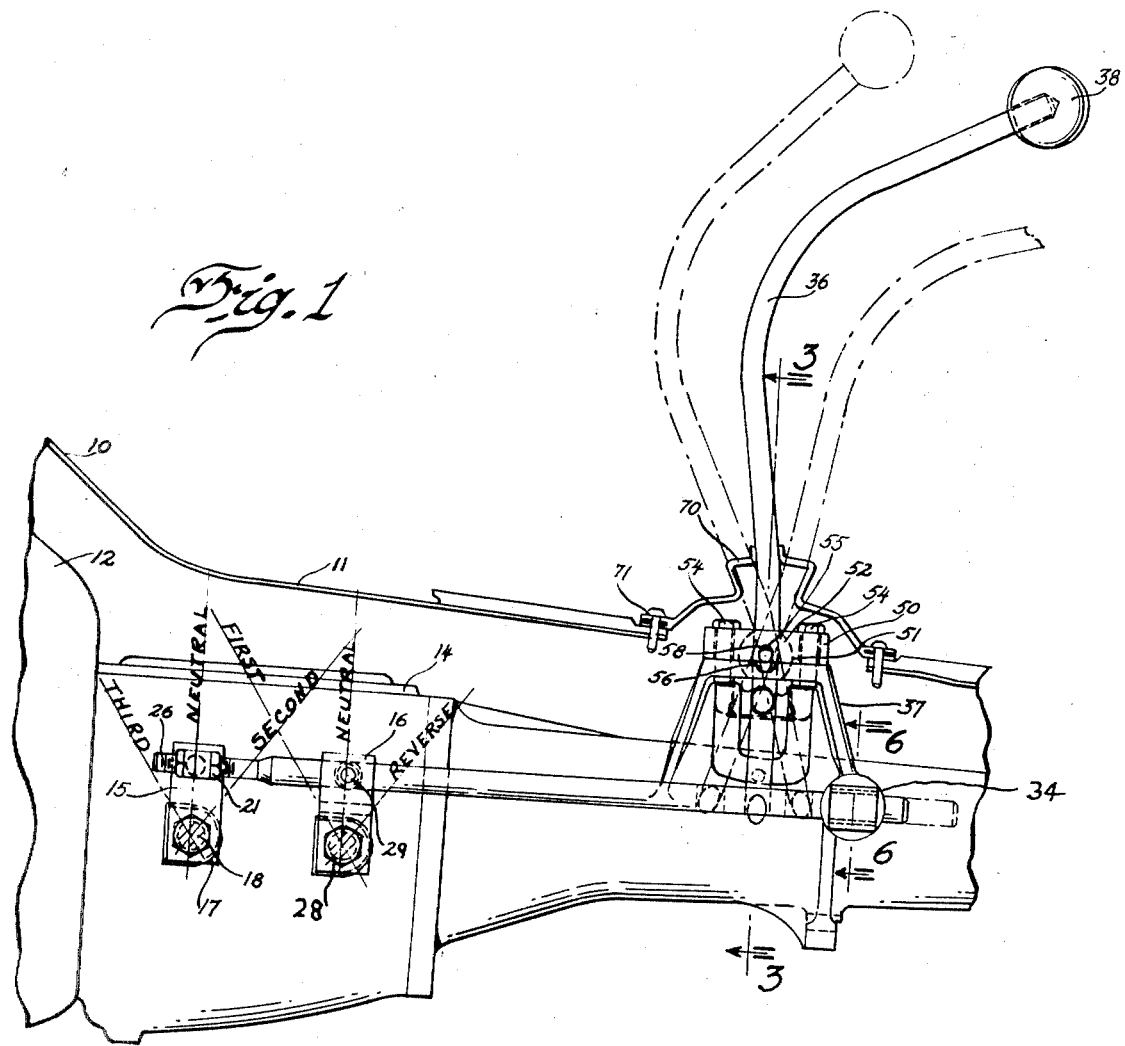
FIG. 1 is a side elevational view of the gear shift control arrangement of this invention mounted on a vehicle, with the vehicle being cut away in the interest of clarity.
Figure 2:
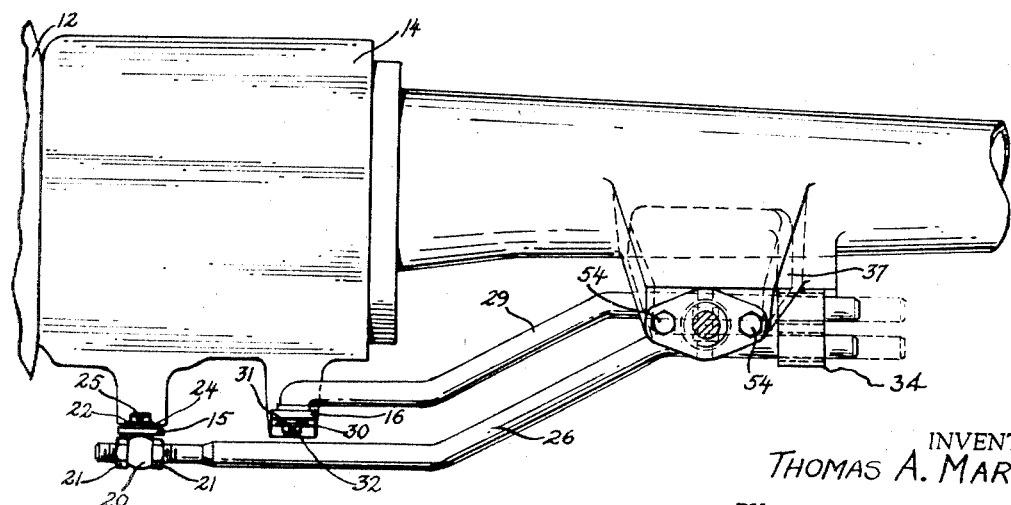
FIG. 2 is a plan view of the arrangement with the vehicle not shown in the interest of clarity.

Referring to FIGS. 1 and 2, 10 indicates a vehicle having a floor pan 11 and clutch housing 12. Transmission 14 is attached to clutch housing 12 by capscrews or the like (not shown). Transmission 14 is a conventional (three forward speeds and a reverse) transmission having control levers 15 and 16 mounted thereon. Lever 15 is connected to shifter shaft 18 which extends into the transmission and utilizes a rectangular connection therewith to transmit motion to shifter shaft 18 to actuate the connected shift fork (not shown). Hex nuts 17 and suitable washers secure control lever 15 to shaft 18. Lever 15 is shown in the neutral position. The forward broken line indicating the lever position for third gear and the rearward broken line indicating the position for second gear. Also connected to lever 15 by trunnion 20, jam nuts 21, plate washer 22, spring washer 24 and cotter pin 25 is rod 26. Trunnion 20, by means of spring washer 24, absorbs any misalignment developed during movement of rod 26.

Transmission control lever 16 is connected to shifter shaft 28 in similar fashion as lever 15. Control lever 16 is shown in the neutral position. The forward broken line position indicating the lever position for first gear and the rearward broken line indicating the position for the reverse gear. Rod 29 is connected to transmission control lever 16 by plate washer 30, spring washer 31 and cotter pin 32.

Figure 7:
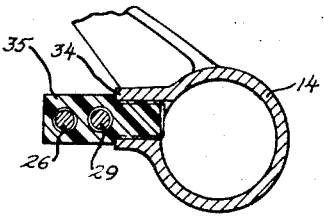
FIG. 7 is a section similar to FIG. 6 of another type of mounting arrangement for the rods.
Figure 6:
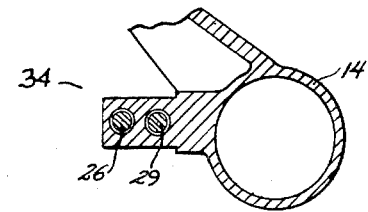
FIG. 6 is a section taken along line 6—6 of FIG. 1 showing the mounting arrangement of the rods.

Referring to FIG. 6, rods 26 and 29 are slidably mounted in boss 34 of transmission 14. FIG. 7 discloses an alternate method of mounting the rods by shortening boss 34 and providing a bearing 35 threaded therein on the exterior of transmission 14. Cap 50, which may be of bearing material which may be plastic as shown. It is to be noted that sufficient clearance must be provided between the rods and the bearing bores therefor to accommodate the angular travel of the other ends of the rods.

Figure 3:
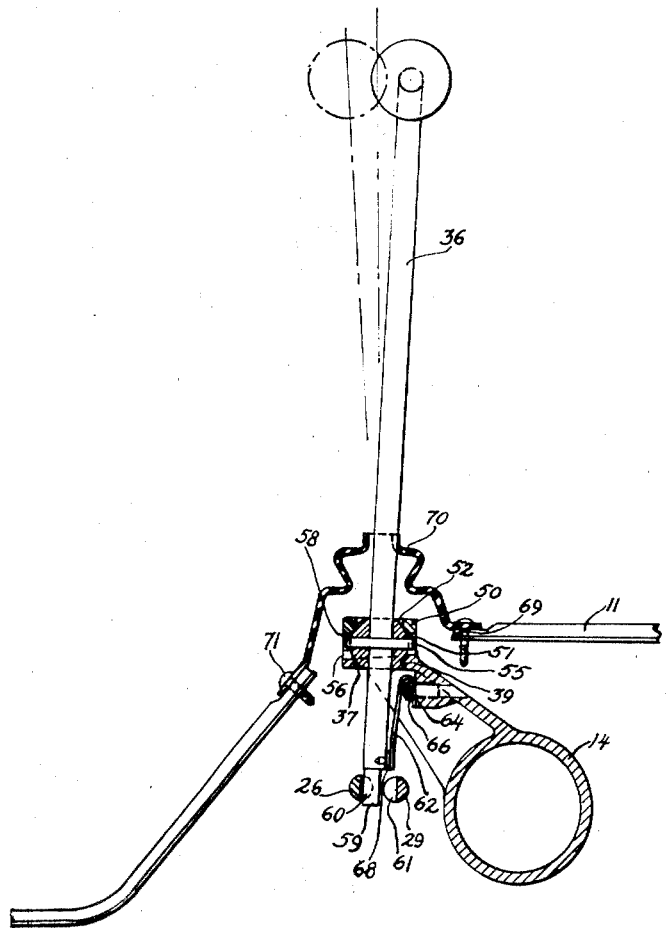
FIG. 3 is a section taken along line 3—3 of FIG. 1.

As best shown in FIGS. 1, 2 and 3, shift lever 36 having knob 38 threaded thereon and ball portion 52 is pivotally mounted via portion 52 in complementary hemispherical socket 39 located in boss 37 on the exterior of transmission 14. Cap 50, which may be of bearing material including plastic (shown) has a hemispherical shaped socket 51 therein enclosing the other half of ball portion 52 of lever 36. Cap 50 is attached to transmission boss 37 by capscrews 54 or the like. Shaft or roll pin 55 extending from ball portion 52 through suitable openings 56 and 58 through sockets 39 and 51 prevents uncontrolled rotation of ball portion 52 in the whole socket composed of hemispherical sockets 39 and 51. Shaft 55 restricts movement of ball portion 52 and therefore lever 36 to movement in a single plane forward toward clutch housing 12 and rearward. The openings 56 and 58 are generally elongated permitting a restricted amount of movement of ball portion 52 and therefore lever 36 in a plane substantially transverse to the plane for forward and rearward motion. This plane constituting the "gate" of the shift sequence. The broken lines showing the moved position of shift lever 36 in FIGS. 1 and 3.

Lever 36 also has a generally squared portion 59 extending between rods 26 and 29 and is adapted to engage detent 60 in rod 26 or a detent 61 in rod 29. Flat spring 62 fastened to transmission 14 by capscrew 64 and lock washer 66 biases lever 36 into detent 60 in rod 26 which is the rod for selection of second or third gear. Bearing means 68, which may be of plastic material, is attached to lever 36 and is constantly in contact with spring 62.

Lever 36 extends through opening 69 in floor pan 11 which may be sealed by rubber boot 70 attached to floor pan 11 by self-tapping screws 71. Although a rubber boot is not shown for the lower part of the gear shift arrangement, same could be provided. In actual practice the transmission body mount (not shown) extends below the arrangement shielding same from dirt and water.

Figure 4:
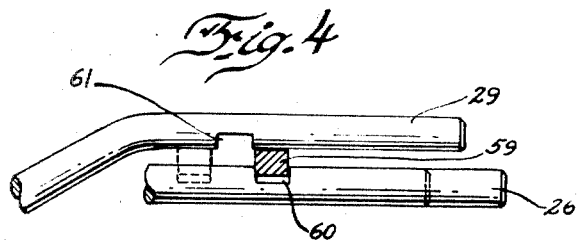
FIG. 4 is an enlarged plan view of the rods in the position they would take when second gear is selected.
Figure 5:
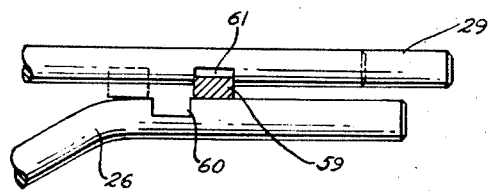
FIG. 5 is an enlarged plan view of the rods in the position they would take when reverse gear is selected.

FIG. 4 discloses portion 59 of lever 36 in detent 60 in rod 26 and same moved rearwardly from the neutral position to select second gear. Rod 29 is shown in the neutral position. The broken line position of rod 26 and portion 59 indicates the third gear position. FIG. 5 discloses the portion 59 of lever 36 in detent 61 of rod 29 and same moved rearward from the neutral position to select reverse gear. The broken line position indicates the first gear position. Rod 26 is in the neutral position. The detents can only be selected when both rods are in the neutral position and the detents facing each other. Of course, should both detents be selected by positioning portion 59 midway therebetween, the rods cannot be moved simultaneously due to the geometry of a conventional interlock located in the transmission. The interlock also preventing movement of a control lever until the other has been returned to the neutral position.

In operation, when shift lever 36 is in the neutral position, recesses or detents 60 and 61 face each other with square portion 59 of lever 36 extending therebetween (see FIG. 3). Spring 62 biases portion 59 into detent 60 in rod 26 thus connecting shift lever 36 through rod 26 with transmission second and third gear control lever 15. To shift to first gear, the operator must move knob 38 and therefore lever 36 to the left against spring 62 (across the "gate"). Portion 59 of lever 36 thus enters detent 61 in rod 29 and movement of lever 36 rearward moves rod 29 and therefore control lever 16 forward to select first gear. Movement of lever 36 causes rearward movement of control lever 16 to select reverse gear. If after shifting to first gear, the operator desires to shift to second, he conventionally disengages the engine clutch and moves lever 36 to neutral and then toward the right "across the gate" to release rod 29 and cause portion 59 ot enter detent 60 in rod 26. Forward movement of lever 36 causes rod 26 to move rearward along with lever 15 to select second gear. Rearward movement of lever 36 moves rod 26 and lever 15 forward to select third gear. It is to be noted that the shift sequence detailed is the conventional sequence for a three speed transmission. Although not shown, a backup light switch could be mounted on transmission 14 for contact by a pin connected to rod 29 when same is moved in the direction to engage reverse gear.

Having thus described the invention it will be apparent to those skilled in the art that various modifications and changes can be made without departing from the spirit of the invention.

I claim:

1. A gear shift control arrangement for a vehicle multi-speed manual transmission, said arrangement comprising:
    (a) a bearing, said bearing being mounted on the exterior of the transmisison;
    (b) a pair of rods mounted in said bearing for axial movement therein, one of said pair of rods being pivotally connected to a first external transmission control lever for selecting second or third gear and the other rod being pivotally connected to a second external transmisison control lever for selecting first or reverse gear, each rod having a detent; and
    (c) a shift lever having a ball portion mounted on the exterior of the transmission for pivotal movement in one plane and in a second plane substantially transverse to the one plane, said shift lever being adapted to engage said detent in either of said rods upon movement in said second plane, and, upon movement in said one plane, said shift lever moving the selected rod and therefore the connected transmission control lever to select the desired gear in the transmission.

2. The gear shift control arrangement of claim 1 in which the detent of each rod face each other with the shift lever extending therebetween when the shift lever is not engaged with either detent.

3. The gear shift control arrangement of claim 2 further comprising: spring means for biasing said shift lever into the detent of said one of said pair of rods for selection of second or third gear.

4. The gear shift control arrangement of claim 3 in which the pivotal mounting of said shift lever on the transmission comprises: said ball portion of said shift lever having a shaft extending outward of said ball portion on both sides thereof, and a cap of bearing material having a hemispherical socket, said cap being secured to complementary construction of the transmission with said ball portion therebetween, said shaft extending out both sides of said cap socket to control ball portion movement and therefore shift lever movement when mounted on the transmission.

5. The gear shift control arrangement of claim 4 in which said spring means is a generally flat spring mounted on the transmission.

6. In a vehicle multi-speed manual transmission having a housing and a first and second external transmission control lever connected to the transmission in the housing, wherein the improvement comprises:
    (a) a bearing mounted on the exterior of said transmission;
    (b) a pair of rods mounted in said bearing for axial movement therein, one of said pair of rods being pivotally connected to said first transmission control lever and the other rod being pivotally connected to said second transmission control lever, each of said rods having a detent; and (c) a shift lever mounted on the exterior of said housing of said transmission for pivotal movement in one plane and in a second plane substantially transverse to the one plane, said shift lever being adapted to engage said detent in either of said rods upon movement in said second plane, and upon movement in said one plane, said shift lever moving the selected rod and therefore the connected transmission control lever to select the desired gear in the transmission.

References Cited

UNITED STATES PATENTS

| | | | |
|---|---|---|---|
| 2,177,212 | 10/1939 | Evrell | 74—473 X |
| 3,452,614 | 7/1969 | Conkle | 74—477 |
| 2,077,578 | 4/1937 | Neracher | 74—473 |
| 3,031,898 | 5/1962 | Eaton | 74—473 |
| 3,040,601 | 6/1962 | Lewis | 74—473 X |
| 3,355,961 | 12/1967 | Easom | 74—473 |

MILTON KAUFMAN, Primary Examiner